United States Patent [19]
DeVincent et al.

[11] 3,929,356
[45] Dec. 30, 1975

[54] TUBE TO BLOCK MOUNTING ASSEMBLY

[75] Inventors: Patsy DeVincent, Dayton; John A. Falkowski, Tipp City; John F. Wiechart, Dayton, all of Ohio

[73] Assignee: General Motors Corporation, Detroit, Mich.

[22] Filed: Nov. 13, 1974

[21] Appl. No.: 523,433

[52] U.S. Cl. ........ 285/305; 285/137 R; 285/DIG. 25
[51] Int. Cl.² .......................................... F16L 35/00
[58] Field of Search .......... 285/305, DIG. 25, 137 R

[56] References Cited
UNITED STATES PATENTS

| | | | |
|---|---|---|---|
| 1,489,310 | 4/1924 | Critchlow | 285/305 X |
| 3,826,523 | 7/1974 | Eschbaugh | 285/DIG. 25 |

FOREIGN PATENTS OR APPLICATIONS

| | | | |
|---|---|---|---|
| 199,484 | 11/1965 | Sweden | 285/305 |
| 14,318 | 1895 | United Kingdom | 285/305 |

*Primary Examiner*—Thomas F. Callaghan
*Attorney, Agent, or Firm*—Arthur N. Krein

[57] ABSTRACT

A tube to block mounting assembly in which a tube, such as a hose tube, is connected to a block, the block being provided with a stepped bore opening therethrough in which the upset annular bead on one end of a tube with an O-ring abutting against one side of the bead can seat, the block also being provided with a through slot intersecting the stepped bore opening which is adapted to receive a spring retainer clip movable in the slot from a position out of interference engagement with the annular bead on the tube to a position in which it engages against the opposite side of the bead from the O-ring to lock and effect sealing of the tube in the block.

3 Claims, 4 Drawing Figures

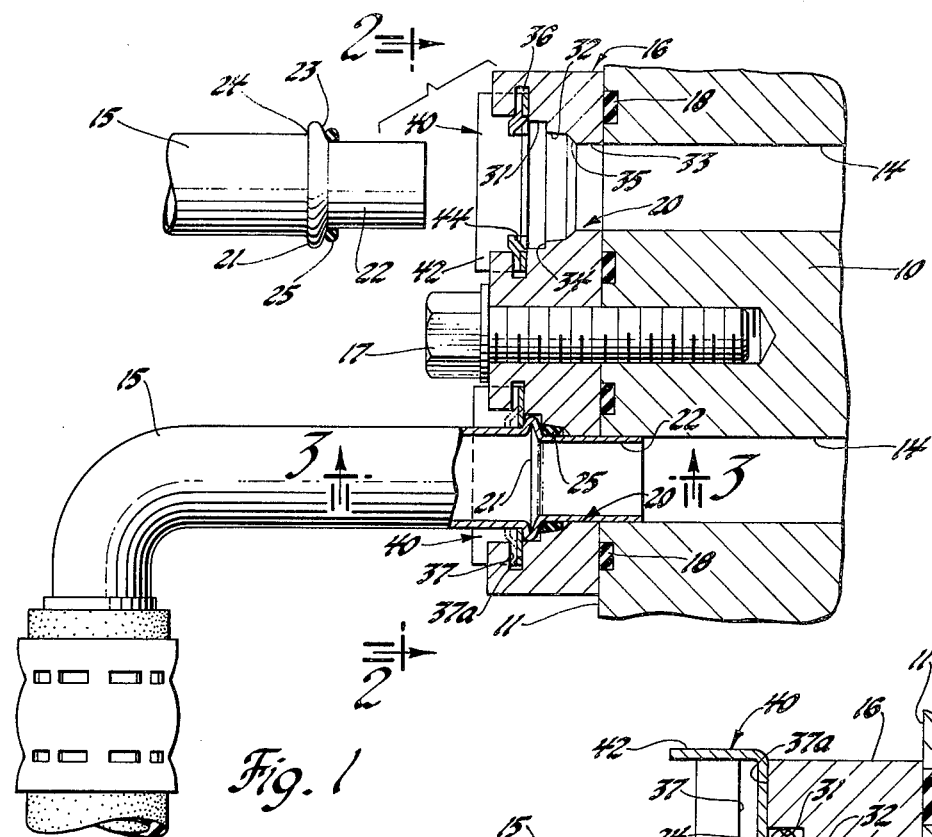
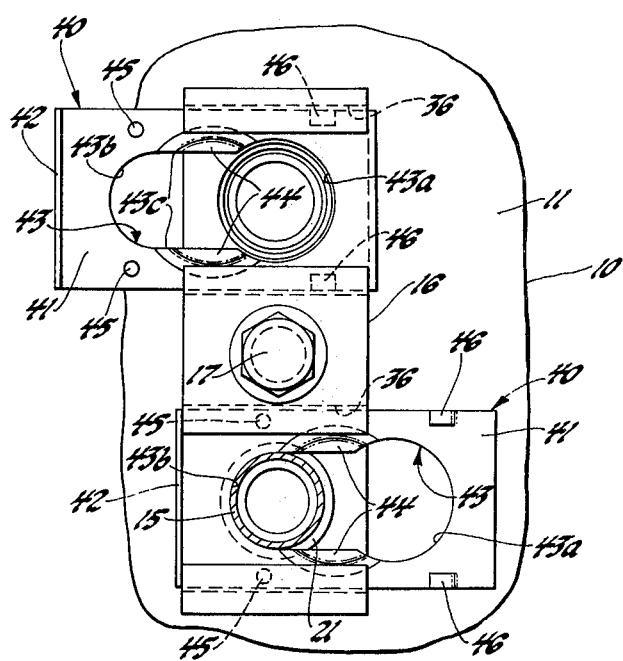
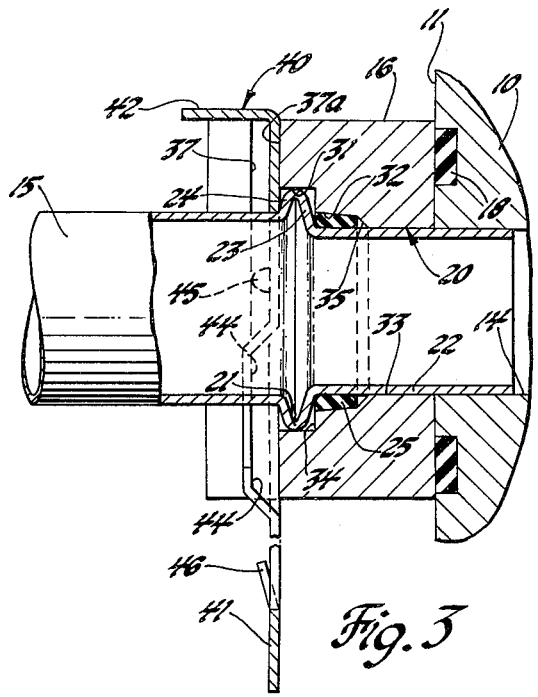
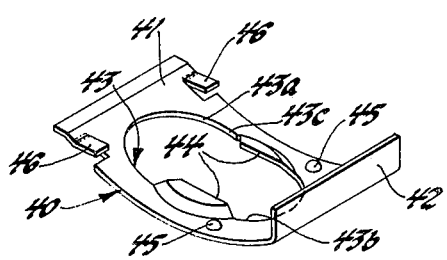

TUBE TO BLOCK MOUNTING ASSEMBLY

This invention relates to conduit couplings and, in particular, to an arrangement for connecting a conduit, such as a hose tube, to a conduit block which may be attached to or formed integral an associated accessory, such as a refrigerant compressor of the type used in vehicle air conditioning systems.

In present day vehicle air conditioning systems, the refrigerant hoses, for example, from the discharge port and to the inlet port of the refrigerant compressor of such a system are each connected to the compressor by means of a tube fitting, each such tube fitting having one end thereof fixed to the flexible hose and its other end connected to the compressor. Such a tube fitting connection to the compressor is made either by means of a male-female threaded tube coupling or it may be fixed, as by brazing, to a compressor connector block which would also have a short pilot tube fixed thereon adapted to enter a corresponding sized hole or port in the compressor housing, such a compressor connector block then being fixed as by means of a bolt or spanner clamp to the machined pad or boss having the hole therein on the compressor housing.

However, such male-female threaded tube couplings are subject to a number of potential leakage paths for the escape of refrigerant fluid and, when the tube and compressor connector block arrangement is used for securing the tube to the refrigerant compressor, this arrangement also provides an excessive number of potential leakage paths for the loss of refrigerant fluid during service as, for example, around the brazed connections. In addition, in both of these prior art arrangements, substantial machining is required to either fabricate the male-female threaded tube coupling or to fabricate the compressor connector block.

It is therefore the principal object of this invention to provide an improved tube to block connection for securing a hose tube or the like to an accessory with an effective seal therebetween and with a minimum of possible leakage paths.

Another object of this invention is to provide an improved tube to block connection wherein the elements of this assembly can be readily manufactured and which is fully field serviceable.

A still further object of this invention is to provide an improved tube to block mounting assembly for securing a tube to a compressor or the like, which is easily separable.

These and other objects of the invention are obtained by means of a tube to block mounting assembly in which the block is provided with a stepped bore therethrough to form a socket to receive the plug end of a tube having an upset bead at one end spaced from a pilot portion of the tube, the pilot portion of the tube having a seal ring encircling it in abutment against one side of the bead whereby upon full insertion of the plug portion of the tube into the block, the seal ring effects a fluid seal therebetween, the block also being provided with a through slot therein intersecting the stepped bore at right angles thereto, whereby the plug end of the tube when fully inserted into the stepped bore of the block can be retained by a retainer clip which is slidably received within the slot and which is movable to a position in which it engages the opposite side of the bead from the seal ring to lock the tube to the block.

For a better understanding of the invention, as well as other objects and further features thereof, reference is had to the following detailed description of the invention to be read in connection with the accompanying drawings, wherein:

FIG. 1 is a view partly in section showing a pair of hose tubes, one of which is connected and the other of which is positioned to be connected to a mounting block fixed to the port surface of an associated accessory, such as a refrigerant compressor, the tube to block mounting assembly of each of the tubes being constructed in accordance with the invention;

FIG. 2 is a view of the tube to block mounting assembly of FIG. 1 taken along line 2—2 of FIG. 1;

FIG. 3 is an enlarged view of one of the tube to block mounting assemblies of the structure of FIG. 1 taken along line 3—3 of FIG. 1; and, FIG. 4 is a perspective view of a spring retainer per se of the tube to block mounting assembly.

Referring first to FIG. 1, there is illustrated the housing 10 of a compressor or similar accessory having a machine pad or boss 11 with a pair of bored passages 14 therein, one of which may be the inlet passage and the other the outlet passage for the compressor. The bore diameter of each of the passages 14, at least for a preselected distance adjacent to the boss 11, is sized such as to slidably receive the pilot portion, to be described, of the tubes 15, associated therewith.

In accordance with the invention, the tubes 15 are adapted to be sealingly coupled to a body member or block, to be described in detail hereinafter, which may be formed integral with the compressor or, as shown, may be formed as a separate body member or block 16 in the form of a compressor connector block, suitably secured to the boss 11 of the compressor as by threaded fastener 17. A suitable seal can also be effected between the block 16 and the boss 11 of the compressor as by the use of suitable O-ring seals 18 positioned in suitable annular grooves provided for this purpose on the boss 11 concentric to the passages 14.

Block 16 is provided with stepped through bores, generally designated 20, therethrough coaxial with the passages 14, to receive the mating or plug ends, of the tubes 15, these tubes being adapted to be releasably secured to the block 16 by spring retainer clips 40 slidably positioned in slots provided for this purpose in the block 16 in a manner to be described in detail hereinafter.

Since the structure for the mating connection of a tube 15 into the stepped bore 20 in the block 16 and the structure of the retainer clip 40 therefore is the same for both tubes and, since the invention is readily applicable to the mounting of one or more tubes of the same or different sizes to a block, the tube to block mounting assembly of the invention will only be described with reference to the mounting of a single tube 15 into a stepped bore 20 in block 16.

In accordance with the invention, a tube 15, preferably thin walled and of uniform thickness, is formed at one end with a plug end which includes an annular external bead 21, which may be upset as shown or otherwise provided on the tube to extend radially outward from the nominal outside peripheral surface of the main body portion of the tube, this bead 21 being spaced a predetermined axial distance from the front or coupling end of the tube, the right-hand end as seen in FIGS. 1 and 3, this end portion of the tube being preferably swaged to a smaller diameter than the nominal diameter of the main body of the tube to provide a cylindrical pilot portion 22. The bead 21 thus provides a pair of opposed radial extending abutments or shoulders 23 and 24, the shoulder 23 facing forward toward the pilot portion of the tube while the shoulder 24 faces in the opposite direction or rearward.

A seal ring 25 in the form of an O-ring is positioned to encircle the pilot portion 22 preferably in abutment against the shoulder 23.

As best seen in FIGS. 1 and 3, a stepped bore 20 through block 16 provides a socket to receive the tube 15 and includes a first bore, which itself may be stepped if desired, extending from the front face of the block to form a cylindrical wall 31 of a minimum diameter greater than the outside diameter of bead 21 on tube 15, a second bore preferably inwardly tapered and of a reduced diameter to form a cylindrical wall 32 providing a cylindrical recess for the seal ring 25, this wall 32 may be axially disposed or, as shown, it may be inclined at an acute angle, for example, 5° to the axis of the stepped bore and, a third bore of a still further reduced diameter forming a cylindrical wall 33 which runs out at the back face of the block 16, the cylindrical wall 33 defining a cylindrical cavity of a size to slidably receive the pilot portion 22 of tube 15. The cylindrical wall 31 and wall 32 are interconnected by an abutment shoulder 34 extending radially therebetween and the walls 32 and 33 are joined by a connecting shoulder 35 which is preferably chamfered to assist, during assembly, in centering and inserting of the pilot portion 22 into the reduced diameter bore defined by wall 33. It is to be realized that shoulder 34 can, if desired, be a chamfered shoulder like connecting shoulder 35.

In addition, block 16 is provided with a transverse slot 36 extending from one side of the block to preferably run out at the opposite side, this slot 36 intersecting the cylindrical wall 31 of the first bore of stepped bore 20 at right angle thereto. The longitudinal width of the slot 36 is substantially greater than the diameter of the first bore of stepped bore 20 and the slot is of a predetermined height between the walls 37 and 37a defining the opposed sides of the slot so as to properly receive the retainer clip 40 and this slot 36 is formed a predetermined axial distance from shoulder 34 for a purpose which will become apparent.

A preferred embodiment of the retainer clip 40 made, for example, of spring steel is shown in its free form in FIG. 4 and such a retainer clip includes a clip body 41 of substantially rectangular configuration that is bowed in a manner similar to a leaf spring, this clip body terminating at one end with an integral upstanding flange 42 projecting upward from the concave side of the clip body 41. A longitudinal extending through slot opening 43 is formed in the clip body 41 and is defined by a semi-circular rim edge 43a at one end of the slot opening that in effect provides an assembly port opening of a size to allow the bead 21 on the tube 15 to pass through, a semi-circular rim edge 43b at the opposite end of the slot opening and by interconnecting spaced apart parallel side rim edges 43c extending tangentially from the rim edge 43b, the edges 43c and rim edge 43b defining a slot opening of a width slightly greater than the outside diameter of the main body portion of tube 15.

In addition, the clip body 41 is deformed adjacent to the side rim edges 43c to provide a stepped portion in the form of arcuate shaped, recessed seat portions 44 located symmetrical about the longitudinal center line of the slot opening 43, these seat portions being formed complementary to bead 21 and extend upward above the concave surface of the main portion of clip body 41 to provide a temporary seat for the shoulder 24 of bead 21, for use during disassembly of the tube 15 from block 16, to permit controlled bleed down of fluid pressure from the tube 15. Additionally, a pair of spaced apart spherical buttons 45 are provided on opposite sides of the clip body to effect flattening of this clip body when in the position shown in FIG. 3 and, in addition, the opposite end of the clip body is pierced to provide a pair of spring fingers 46, for a purpose to be described.

The retainer clip 40 may be considered to be a snap slide fastener that provides a pair of detents or abutment shoulders, one spaced apart from the other, which is an axial spacing with respect to the axis of bore 20 when the retainer clip is operatively positioned in the slot 36 in block 16, so that these abutment shoulders may be selectively positioned for abutment against the shoulder 24 of bead 21 to effect axial positioning of tube 15 in block 16 or they may be moved out of interference relationship with the bead 21 to permit free axial movement of the tube 15. Thus, the portions of the clip body 41 adjacent to rim edge 43b and of edges 43c adjacent thereto provide a first detent or abutment shoulder while the seat portions 44 provide the second detent or abutment shoulder.

In assembling a tube 15 to the block 16, the retainer clip 40 is first inserted into slot 36 in block 16 with the concave side of the clip portion 41 thereof and, of course, the flange 42, facing the front of the block 16 and the retainer clip is positioned so that the assembly port opening of slot opening 43 is concentric with the stepped bore 20 of the block, the position of the retainer clip shown in the upper portion of FIG. 2. The retainer clip 40 is releasably retained in this position by the spring fingers 46 engaging the wall 37 of the block.

The plug end of tube 15, with the seal ring 25 encircling pilot portion 22 thereof, is then inserted axially into the stepped bore 20 of the block to a position substantially as that shown in the bottom portion of FIG. 1 and in FIG. 3, with shoulder 23 of bead 21 then in abutment against or closely adjacent to the shoulder 34 of the block 16 and, in This position, the seal ring 25 is compressed against the cylindrical wall 32 of the block 16 and the outer periphery of pilot portion 22. The retainer clip 40 is then moved to a retaining position, the position shown in the lower portion of FIG. 2, with the flange 42 against one side of block 16, in which position the smaller portion of the slot opening defined by the rim edge 43b partly encircles the body portion of tube 15 directly behind the bead 21. In this position, the shoulder 24 of the bead 21 abuts against the clip body 41 of the retainer clip. When the retainer clip is in this latter position, the buttons 45 have engaged the wall 37 of the block 16 on diametrically opposite sides of the tube 15 so as to, in effect, cause the normally bowed clip body 41 of the retainer clip to flatten out against wall 37a causing an axial force to be applied against the bead 21 of the tube 15 thereby effecting further making of the seal ring 25. With the retainer clip 40 in the position just described, tube 15 is effectively locked and sealed in block 16.

During disassembly, the stepped portion forming the recessed seat portions 44 allows two-stage disengagement of the tube 15 from block 16. That is, during disassembly as the retainer clip 40 is moved from the locking position shown in the bottom portion of FIG. 2, that is, moved to the left with reference to this position of the retainer clip shown, the recessed seat portions 44 of the retainer clip are moved into a position at which they are concentric with the tube 15 thereby permitting limited outward axial movement of the tube from the block 16 to a position in which the shoulder 24 of the tube then engages these recessed seat portions 44 and, as this occurs, if there is any fluid pressure in the tube 15, it will cause the seal ring 25 to move out of sealing engagement with the wall 32, that is, to break the seal, and thus permit a controlled bleed down of any fluid pressure from tube 15. After bleed down, the retainer clip 40 can then be moved further so that the assembly port opening of slot opening 43 is positioned to permit complete axial withdrawal of the tube 15 from block 16.

What is claimed is:

1. A tube mounting assembly comprising a body member having a cylindrical stepped bore extending from one surface thereof and defining a socket, said body member having a slot opening extending transversely from one side thereof and intersecting said stepped bore at right angle thereto closely adjacent to said one surface, a tubular member having a plug portion at one end thereof which is slidably received in said socket and in sealing relation to said socket when fully inserted therein, said plug portion including an annular bead on the exterior of said tubular member providing a radial shoulder and, a retainer clip means having a body portion with a longitudinal extending through slot opening therein defined by a first semi-circular rim edge at one end of a diameter to slidably receive said annular bead, a second semi-circular rim edge at the opposite end and by interconnecting spaced apart rim edges, said rim edges providing a first shoulder means and a second shoulder means in parallel spaced apart relation to each other and longitudinally spaced apart on said body portion, said retainer clip means being slidably received in said slot, whereby said retainer clip means is movable from a position in which said first shoulder means engages said shoulder of said bead when said plug portion is fully inserted into said socket to retain said plug portion fully engaged and sealed, a second position at which said second shoulder means engages said shoulder to retain said plug portion within said socket in a position out of sealing engagement therewith and a third position at which said first semi-circular rim edge is concentric with said stepped bore to permit removal of said plug portion from said body.

2. A tube mounting assembly comprising a tube having a plug portion at one end thereof defined by an external annular bead on said tube and a cylindrical pilot portion extending from one side of said bead to a free end of said tube, a seal ring encircling said pilot portion adjacent to said bead, a body member having a stepped bore extending from one surface thereof and defining a socket to slidably receive said plug portion in sealing relation therewith when said plug portion is fully inserted into said socket, said stepped bore including a first counterbore to provide a cylindrical internal wall extending from said one surface and terminating at an inward extending radial shoulder, said internal wall being of a diameter to receive said bead, said body member having a slot opening extending transversely from one side of said body member to intersect said internal wall at right angle thereto a predetermined axial distance from said radial shoulder and a retainer clip means providing a first detent means and a second detent means in axial spaced apart relation to each other relative to said stepped bore and an opening of a diameter greater than the outside diameter of said bead, said retainer clip means being slidably received in said slot for movement between positions such that in a first position said first detent means engages said bead when said plug portion is fully inserted into said socket to retain said plug portion fully engaged and sealed, in a second position said second detent means is positioned to engage said bead to retain said plug portion within said socket out of sealing engagement therewith and in a third position in which said opening is concentric with said stepped bore for passage of said bead therethrough.

3. A tube to block mounting assembly comprising a tube having an external annular bead thereon and a cylindrical pilot portion extending from one side of said bead to a free end thereof, a seal ring encircling said pilot portion adjacent to said bead, a block having a stepped bore therein including a first bore of a diameter greater than the outside diameter of said bead, a second bore of reduced diameter inwardly of said first bore with an intervening radial shoulder between said first bore and said second bore, said second bore forming a cylindrical wall seat within said block for said seal ring and, a third bore of reduced diameter compared to said second bore and of a size to receive said pilot portion of said tube, said block further having a slot extending from at least one side thereof transversely to intersect said first bore at right angle thereto at a predetermined axial spaced distance from said radial shoulder and, a retainer clip having a longitudinal extending slot opening therein defining at one end thereof an assembly port opening of a diameter to allow said bead to pass therethrough, defining at its other end a reduced diameter opening of a size to partly encircle said tube and of a size to be in interference relation to said bead, said assembly port opening and said reduced diameter opening being interconnected by spaced apart edges defining an opening to slidably receive said tube, said edges being deformed to provide a recessed seat in a direction away from said radial shoulder in said block to receive said bead, said retainer clip being slidably received in said slot for movement from a tube removal position in which said assembly port opening is concentric to said stepped bore to a locked position in which said reduced diameter opening is aligned with said stepped bore and said retainer clip abuts against one side of said bead to effect locking and sealing of said tube in said block and to an intermediate position between said tube removal position and said locked position whereat said recessed seat is in alignment with said stepped bore whereby said tube can move axially in a direction relative to said block in an uncoupling direction until said bead engages said recessed seat.

* * * * *